United States Patent
Panzer et al.

(10) Patent No.: US 10,400,945 B2
(45) Date of Patent: Sep. 3, 2019

(54) MOUNTING PLATE AND LIFTING COLUMN INCLUDING A MOUNTING PLATE

(71) Applicant: Aktiebolaget SKF, Göteborg (SE)

(72) Inventors: Hans Peter Panzer, Lörrach (DE); Martin Voegelin, Hölstein (CH)

(73) Assignee: Aktiebolaget SKF, Gothenburg (SE)

( * ) Notice: Subject to any disclaimer, the term of this patent is extended or adjusted under 35 U.S.C. 154(b) by 1401 days.

(21) Appl. No.: 13/975,602

(22) Filed: Aug. 26, 2013

(65) Prior Publication Data

US 2014/0054522 A1 Feb. 27, 2014

(30) Foreign Application Priority Data

Aug. 24, 2012 (DE) .................. 10 2012 215 131

(51) Int. Cl.
*B66F 3/00* (2006.01)
*F16M 13/02* (2006.01)
*B66F 3/44* (2006.01)
*B66F 3/08* (2006.01)
*B66F 3/10* (2006.01)
*B66F 7/14* (2006.01)

(52) U.S. Cl.
CPC ............... *F16M 13/02* (2013.01); *B66F 3/08* (2013.01); *B66F 3/10* (2013.01); *B66F 3/44* (2013.01); *B66F 7/14* (2013.01)

(58) Field of Classification Search
CPC ...... B66F 3/08; B66F 3/10; B66F 3/44; B66F 7/10; B66F 7/12; B66F 7/14; A61G 13/02
USPC ............................................. 254/98; 248/678
See application file for complete search history.

(56) References Cited

U.S. PATENT DOCUMENTS

| | | | | |
|---|---|---|---|---|
| 3,304,794 A | * | 2/1967 | Bird | B66F 3/08 74/409 |
| 4,635,492 A | * | 1/1987 | Uebelhart | A47B 9/20 248/405 |
| 5,425,595 A | * | 6/1995 | Roper | E01F 13/046 404/9 |
| 6,234,034 B1 | * | 5/2001 | Ando | F16H 25/2472 187/267 |

(Continued)

FOREIGN PATENT DOCUMENTS

| | | |
|---|---|---|
| DE | 8515755 U1 | 11/1985 |
| EP | 1674764 A1 | 6/2006 |

(Continued)

*Primary Examiner* — Lee D Wilson
(74) *Attorney, Agent, or Firm* — Laurence A. Greenberg; Werner H. Stemer; Ralph E. Locher (57) ABSTRACT

A mounting plate for mounting a lifting unit in a lifting column which lifting column includes at least two guide tube segments that are insertable substantially concentrically one-into-another and that are movable with respect to one another along their direction of extension in order to change the length of the lifting column. The mounting plate includes a motor-accommodating structure for a drive motor of the lifting unit and an accommodating structure, different from the motor-accommodating structure, for a support component of the lifting unit that is connectable in a rotationally fixed manner to mounting plate. The support component is disposed on a side of the lifting unit remote from or facing away from the drive motor. Also, a lifting column including the mounting plate.

20 Claims, 3 Drawing Sheets

(56) References Cited

U.S. PATENT DOCUMENTS

| | | | | |
|---|---|---|---|---|
| 6,626,606 B1* | 9/2003 | Johnson | ................ | E01F 13/046 404/10 |
| 7,244,075 B2* | 7/2007 | Stadler | ................ | E01F 13/046 404/6 |
| 7,850,131 B2* | 12/2010 | Battistella | .............. | A61G 13/02 248/161 |
| 8,495,924 B2* | 7/2013 | Fukano | ............... | F16H 25/2454 254/98 |
| D710,563 S * | 8/2014 | Panzer | ......................... | D25/126 |
| 9,133,589 B2* | 9/2015 | Ball | ..................... | E01F 13/046 |
| 2003/0146425 A1* | 8/2003 | Drake | ..................... | A47B 9/12 254/264 |
| 2005/0161648 A1* | 7/2005 | Oudelaar | ............ | F15B 15/165 254/93 R |
| 2006/0144179 A1* | 7/2006 | Greilinger | .......... | F16H 25/2472 74/89.23 |
| 2006/0185563 A1* | 8/2006 | Sweere | ............. | A47B 21/0073 108/28 |
| 2008/0087775 A1* | 4/2008 | Kuo | ........................ | F16C 29/02 248/125.1 |
| 2008/0099637 A1* | 5/2008 | Pai | ........................ | F16M 11/30 248/157 |
| 2010/0187379 A1* | 7/2010 | Kragh | ..................... | A47B 9/12 248/188.4 |
| 2016/0229244 A1* | 8/2016 | Drake | ..................... | B60D 1/66 |

FOREIGN PATENT DOCUMENTS

| | | |
|---|---|---|
| WO | 0174198 A1 | 10/2001 |
| WO | 20080012201 A1 | 1/2008 |

* cited by examiner

MOUNTING PLATE AND LIFTING COLUMN INCLUDING A MOUNTING PLATE

CROSS-REFERENCE

This application claims priority to German patent application no. 10 2012 215 131.1 filed on Aug. 24, 2012, the contents of which are fully incorporated herein by reference. Applicants respectfully note that Aug. 24, 2013 falls on a Saturday; therefore, Applicants are afforded through the next business day to maintain copendency.

FIELD OF THE INVENTION

Exemplary embodiments relate to a mounting plate for mounting a lifting column in a guide tube unit of a lifting column and to a lifting column that includes such a mounting plate.

RELATED ART

Lifting columns, which are also called telescopic columns or telescopic actuators, are used in a wide variety of medical devices, for example, in wheelchairs, examination tables, patient beds, and medical equipment. They are also used outside the medical field, for example, in industrial applications for facilitating movement of machine parts or other components along a direction of movement.

Lifting columns generally comprise at least two tube-shaped or column-shaped guide tube segments which are concentrically insertable one-into-another (telescopic). The guide tube segments are movable relative to one another along a direction of extension that substantially coincides with the previously mentioned direction of movement. This arrangement allows the length of the lifting column to be changed.

The particular configuration of such a lifting column depends on a variety of different factors, including for example the planned use of the lifting column and the routing of electrical, hydraulic, or other types of supply lines in or near the lifting column. Depending on the specific application, different lifting columns can thus be required or advisable for use with otherwise identical individual components (e.g., the guide tubes). For example, it may be desirable in the case of a vertical assembly of the lifting column to dispose an inner guide tube segment of the at least two guide tube segments above, or alternately below, a corresponding outer guide tube segment. Independently of the arrangement of guide tubes that is selected, it may be desirable to mount a drive motor of a lifting unit on an upper or a lower end of the lifting column. In any case, the drive motor is integrated in the lifting column and serves to change the length of the lifting column parallel to the direction of extension. While such lifting columns function adequately for their intended purpose, it would be desirable to simplify and/or provide a greater degree of flexibility in the manufacture of a lifting column.

SUMMARY OF THE INVENTION

This need is addressed by a mounting plate for mounting a lifting unit in a lifting column, and by a lifting column as described herein in connection with various aspects of the present invention. A mounting plate according to an exemplary embodiment is usable for mounting a lifting unit in a guide tube unit having at least two guide tube segments. The lifting unit is formed to change a length of a lifting column parallel to a direction of its extension, and the lifting column includes the least two guide tube segments that are telescopic or insertable one-into-another in a substantially concentric manner. The guide tube segments are moveable with respect to one another along their direction of extension to change the length of the lifting column. The mounting plate includes a motor-accommodating structure for a drive motor of the lifting unit, and an accommodating structure, different from the motor-accommodating structure, for a support component of the lifting unit which accommodating structure is to be connected in a rotationally fixed manner to the mounting plate. The support component is disposed on a side of the lifting unit facing away from the drive motor.

A mounting plate according to an exemplary embodiment is based on the recognition that manufacturing a lifting column can be simplified and/or made more flexible by using a mounting plate according to an exemplary embodiment, which mounting plate comprises both a motor-accommodating structure and an accommodating structure for the support component of the lifting unit, although often only one of the two is occupied on a given mounting plate. It is optionally possible to construct the individual lifting columns with their guide tube segments and the lifting unit substantially completely independently of one another, and to mount the lifting unit in the guide tube unit only at the end of a production process.

In addition to the drive motor, the lifting unit generally includes a support component that is mechanically connected on a side of the lifting unit remote from or facing away from the drive motor using a corresponding mounting plate. This serves to absorb or dissipate the forces of the lifting unit on the mounting plate, and thus on the corresponding guide tube segment of the lifting column.

With a mounting plate according to an exemplary embodiment, the accommodating structure can optionally be formed to create the rotationally fixed connection to the support component by an interference-fit or friction-fit connection to the support component. In this way it is possible to create, in a structurally simple way, a loadable and durable rotationally fixed connection between the lifting unit and the mounting plate. As used herein, a "friction-fit" connection results from static friction, a "materially-bonded" connection results from molecular or atomic interactions and forces, and an "interference-fit" connection results from a geometric connection of the respective connecting elements. The static friction in particular presupposes a normal force component between the two connecting partners.

In such a mounting plate according to an exemplary embodiment, the accommodating structure can optionally have a polygonal, for example square or rectangular, cross-section perpendicular to the direction of extension. Such a polygonal cross-section further simplifies the mounting of the lifting unit in association with the mounting plate because the support component is more easily insertable into or attachable to the mounting plate. In this way, a higher torque can optionally be reliably transmitted. Thus, for example, a regular, partially regular, or even irregular polygonal cross-section can be used. Such a cross-section can comprise, for example, an integer rotational symmetry, which can optionally vary from the number of corners of the polygon, but which can also agree therewith.

Thus at least one component can have an n-fold rotational symmetry, where n is an integer greater than or equal to 2. An n-fold rotational symmetry exists if the component in question can be rotated about an axis of rotation or symmetry by $(360°/n)$ and still look the same, i.e. upon a corresponding rotation it is substantially mapped to itself in the mathematical sense. In contrast, with a completely rotationally symmetric embodiment of a component, with any turn of any angular extent about the axis of rotation or symmetry, the shape of the component remains the same, i.e. is substantially mapped to itself in the mathematical sense.

With a mounting plate according to an exemplary embodiment, the accommodating structure can optionally have an opening which is formed to accommodate the support component. Such a configuration may make it possible to further simply the mounting of the lifting unit onto the mounting plate because the support component is inserted into the opening during assembly and thus stabilized. Of course the opening in the accommodating structure can optionally have an integer rotational symmetry which may simplify a mounting of the lifting unit on the respective mounting plate.

In a mounting plate according to an exemplary embodiment, the accommodating structure and the motor-accommodating structure can optionally be disposed on different sides of a centerline that runs perpendicular to the direction of extension. Thus it may be possible to match the motor-accommodating structure and the accommodating structure for the support component in a manner which is more targeted to their respective functions, and thus to achieve a greater load-bearing capacity. Additionally or alternatively, it may be possible to further simplify the mounting of the lifting unit on the mounting plate because this may result in a better spatial separation of the accommodating structure and the motor-accommodating structure.

A mounting plate according to an exemplary embodiment may further comprise an attachment structure formed to connect the mounting plate to one of the at least two lifting column segments. The corresponding connection is a mechanical connection, but not necessarily an electrical or other information-carrying connection.

With such a mounting plate according to an exemplary embodiment, the attachment structure can have a plurality of holes that are formed and disposed such that the mounting plate is connectable to one of the lifting column segments using threaded fasteners such as screws. In this way a stable mechanical connection can be created between the mounting plate and the respecting lifting column segment using structurally simple elements.

Additionally or alternatively, in a mounting plate according to an exemplary embodiment, the attachment structure can comprise a guide profile, which is formed such that a counter-guide profile of an adapter component is pushable or slidable onto the guide profile, so that the mounting plate can be connected via a plurality of holes in the adapter component to one of the lifting column segments. Thus provides a flexible mounting of the lifting unit on the lifting column or its lifting column segments because any differences with respect to elongation perpendicular to the direction of the extension of the lifting column can be offset or compensated by the use of an appropriate adapter component.

A mounting plate according to an exemplary embodiment can be manufactured from an injection-moldable material, for example by an injection molding process. In this way it can be possible to provide a stable and loadable mounting plate in a technically simple manner.

A pair of mounting plates according to an exemplary embodiment may be provided for mounting a lifting unit. The lifting unit has a motor and a support component and is mounted in a lifting column comprising first and second telescoping tube segments. The first and second telescoping tube segments each have a longitudinal axis, an interior and a profile perpendicular to the longitudinal axis. A first mounting plate of the pair of mounting plates has a first periphery configured to be slidingly received in the interior of the first tube segment, and a first side and a second side opposite the first side. The first and second sides are bounded by the first periphery, and the first mounting plate also has a motor mount on the first side and a support mount on the first side. A second mounting plate of the pair of mounting plates has a second periphery configured to be slidingly received in the interior of the second tube segment, and a first side and a second side opposite the second mounting plate first side. The first and second sides of the second mounting plate are bounded by the second periphery, and the second mounting plate has a motor mount on the second mounting plate first side and a support mount on the second mounting plate first side. The pair of mounting plates are mountable in the first and second telescoping tube segments with the first side of the first mounting plate facing the first side of the second mounting plate.

A lifting column according to an exemplary embodiment may include two lifting column segments that are telescopic or substantially concentrically insertable one-into-another and that are movable with respect to one another along their direction of extension. The lifting column may also include a lifting unit and first and second mounting plates according to an exemplary embodiment. The lifting unit is disposed in the lifting column and arranged so as to change a length of the lifting column parallel to the direction of extension, and the lifting unit includes a drive motor and a support component on one of the sides facing away from the drive motor. The drive motor of the lifting unit is connected to the first mounting plate, and the support component is connected to the second mounting plate.

A lifting column according to an exemplary embodiment may include a first tube segment having an interior and a second tube segment having an interior that is slidingly mounted in the first tube segment. The column also includes a first mounting plate mounted in the first tube segment that has a first side and a second side opposite the first side, a motor mount on the first side and a support mount on the first side. The column also includes a second mounting plate mounted in the second tube segment that has a first side and a second side opposite the second mounting plate first side, a motor mount on the second mounting plate first side and a support mount on the second mounting plate first side. A motor is mounted on the motor mount of the first mounting plate, and a support is mounted on the support mount of the second mounting plate and operatively connected to the motor.

Two objects are "adjacent" here if no further object of the same type is disposed between them. Objects are "directly adjacent" if they adjoin or abut one another, i.e. they are in contact with one another. Here a "one-piece component" is understood to mean a component that is manufactured from one continuous piece of material. The term "one-piece" can therefore by synonymously used with the terms "integral" or "one-part." Here a "mechanical coupling" of two components includes both a direct and an indirect coupling. Electrical or other components are indirectly connected via a further component or directly coupled to one other such that a signal exchange is possible between the relevant components. The respective coupling can thus be partially or fully introduced and implemented for example electrically, optically, magnetically, or using radio technology. Despite the word "direction," in the present case each individual "direction" is not necessarily a direction in the mathematical sense of a vector, but rather a line along which the corresponding movement occurs. Such a line can be straight, but can also be curved. To be distinguished here are directions which are actually directions along a line, for example the direction of movement. Thus for example a first direction can oppose a second direction, but both may extend or be oriented along a line which is also designated as a direction.

BRIEF DESCRIPTION OF THE DRAWINGS

Exemplary embodiments are described and explained in more detail below with reference to the accompanying Figures.

DETAILED DESCRIPTION

In the following description of the accompanying Figures, like reference numerals refer to like or comparable components. Furthermore, summarizing reference numerals may be used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

Figure 1A:
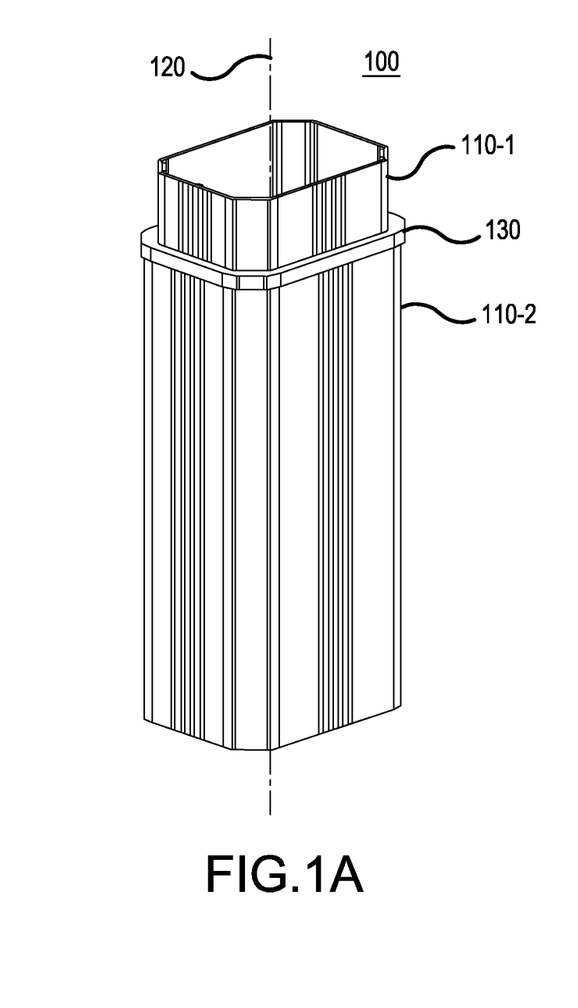
FIG. 1a is a perspective view of a guide tube unit having inner and outer guide tube segments with the inner guide tube segment being disposed at an upper vertical end.

FIG. 1a shows a perspective view of a guide tube unit 100 which comprises at least two guide tube segments 110-1, 110-2 disposed substantially concentrically around a central axis 120 and that are telescopically insertable one-into-another. The central axis 120 also represents a direction of extension with respect to which the length of the lifting column is changeable.

Due to the concentric, one-into-another insertable configuration of the two guide tube elements 110, the guide tube element 100 includes an inner guide tube segment 110-1 and an outer guide tube segment 110-2. A cover 130 is disposed between the two guide tube segments 110-1, 110-2 along the central axis 120, i.e. along the direction of extension 120, and the cover 130 serves as a seal for the gap between the guide tube segments 110. The cover 130 protects against the entry of foreign matter in the region between the guide tube segments 110, and foreign matter can thereby be substantially prevented from entering the inside of guide tube unit 100.

At this point it should be noted that the illustration of FIG. 1a does not show a complete lifting column, but rather only represents the arrangement of the two guide tube segments 110 with respect to each other. Thus the lifting column shown in FIG. 1a does not include a lifting unit or a mounting plate on which the lifting unit is attached.

FIG. 1a only shows an example of a lifting column 100 according to an exemplary embodiment having two guide segments 110. Lifting columns 100 according to an exemplary embodiment can of course comprise more than two guide tube segments 110. These can be radially cascaded, i.e. disposed with different spacings from the central axis 120. Lifting columns 100 according to an exemplary embodiment thus include at least two guide tube segments 110, but can also comprise more than the two guide tube segments that are shown in FIG. 1a.

Figure 1B:
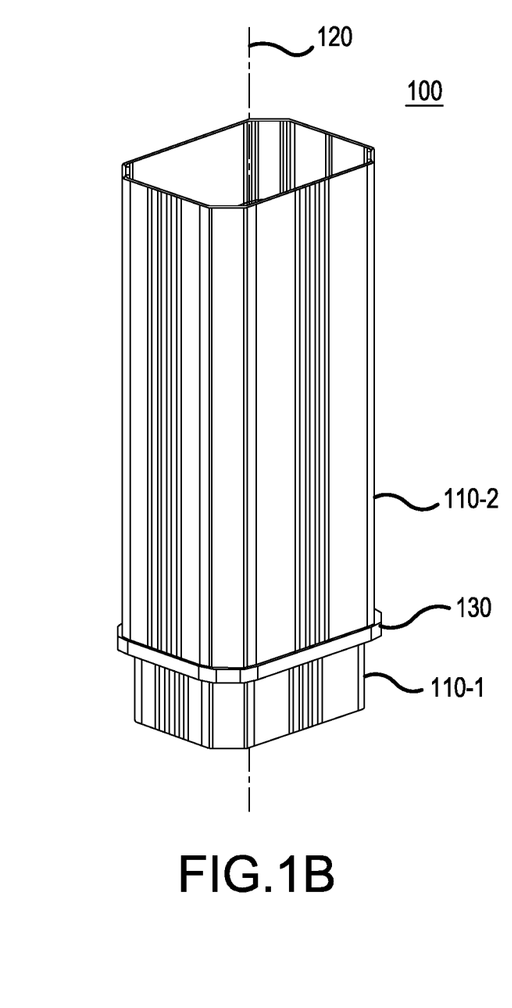
FIG. 1b is a perspective view of a guide tube unit having inner and outer guide tube segments with the inner guide tube segment being disposed at a lower vertical end.

FIG. 1b shows a view, comparable to FIG. 1a, of a further lifting column 100 according to an exemplary embodiment. For clarity in FIG. 1b, neither the lifting unit nor the corresponding mounting plates are shown. In contrast to the lifting column 100 shown in FIG. 1a, wherein the inner guide tube segment 110-1 extends vertically upward out of the outer guide tube segment 110-2, in the variant shown in FIG. 1b the vertical arrangement of the two guide tube segments 110 is reversed. In other words, in this variant the inner guide tube segment 110-1 is the vertically lower or lowest guide tube segment 110.

Figure 2A:
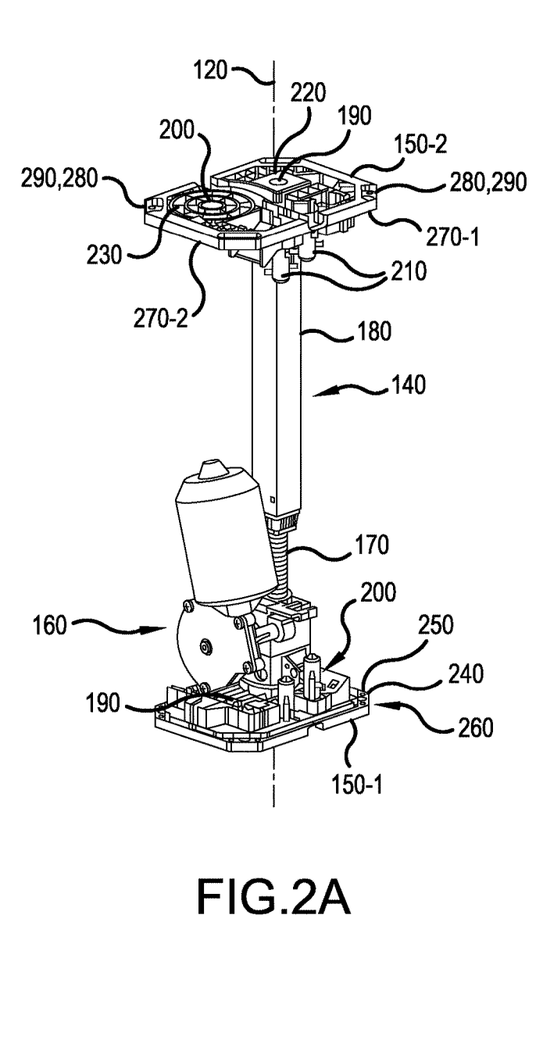
FIG. 2a is a perspective view of a lifting unit attached to two mounting plates according to an exemplary embodiment and a drive motor attached to the lower mounting plate.

FIG. 2a shows a perspective view of a lifting unit 140, that is connected according to an exemplary embodiment on both its vertically upper and vertically lower ends to a respective mounting plate 150. As is explained in more detail below, the mounting plate 150-1 is insertable into an inner guide tube segment 110-1 and is attachable thereto. The mounting plate 150-2, on the other hand, is attachable or mountable to an outer guide tube segment 110-2. However, before the detailed design of the mounting plate 150 is described in more detail, the lifting unit 140, which may be referred to herein as the drive unit, will first be described in more detail.

The lifting unit 140 is based on the use of a spindle drive. The lifting unit 140 thus includes a drive motor 160 formed and disposed such that it can rotate a threaded spindle 170. The drive motor 160 can be embodied here as an electric motor; however it may optionally be embodied as a pneumatic or hydraulic motor. The threaded spindle 170 engages a support component 180 of the lifting unit 140 in such a manner that during a rotation or turning of the threaded spindle 170, if the support component 180 is prevented from rotating, the support component 180 moves toward or away from the lower mounting plate 150-1. Movement of the support component 180 is along the direction of extension 120, and its direction of movement depends on the direction of rotation of the threaded spindle 170. The support component 180 thus may comprise a nut or ball nut or another appropriate component which, in conjunction with the threaded spindle 170, converts a rotational movement of the threaded spindle 170 into a linear movement along the central axis 120.

In order to prevent a corresponding rotational movement of the support component 180 with respect to the lifting column segment 110, the mounting plates 150 each include an accommodating structure 190. The accommodating structure is formed to accommodate the support component 180 of the lifting unit 140 so that it is rotationally fixed at least with respect to a rotational movement about the direction of extension 120 or an axis parallel thereto. As explained in more detail below in the context of FIGS. 3a to 3c, the accommodating structure 190 has an opening for this purpose, and the opening has a polygonal cross-section (in the present case a square cross-section). Thus the rotationally fixed connection to the support component 180 is effected via an interference-fit connection between the mounting plate 150 and the support component 180.

In addition to the accommodating structure 190, the mounting plates 150 further include a motor-accommodating structure 200 that is formed to accommodate the drive motor 160 on the mounting plate and to make possible a mechanical attachment of the drive motor 160 to the mounting plate 150. For this purpose the motor-accommodating structure 200 may have appropriate holes or other structures, for example columnar projections, by way of which a mechanical fixing or attachment of the drive motor 160 can be effected partially or completely.

FIG. 2a also illustrates shows two domes 210 for cable routing.

Due to the arrangement of the two mounting plates 150, FIG. 2a shows the mounting plate 150-2 from a rear side, while the mounting plate 150-1 is shown from a front side, wherein however the accommodating structures 190, 200 of the lifting unit 140 are at least partially covered. However, FIG. 2a clearly shows the opening 220 from the rear side in which the support component 180 is inserted.

In addition, the rear side of the mounting plate 150-2 in FIG. 2a shows a plurality of reinforcing or stiffening structures 230, which may be formed as reinforcing ribs. These serve to mechanically stabilize the mounting plate 150 and allow the mounting plate 150 to be formed as an injection-molded part from an injection-moldable material.

As will be described in more detail below in connection with FIGS. 3a to 3c, the mounting plates 150 further include attachment structures 240 which are holes 250 in the case of the mounting plate 150-1. The mounting plate 150-1 can be screwed to the respective lifting column segment 110-1 using these holes 250. The holes 250 or their attachment structures 240 are respectively disposed on four angled or chamfered or beveled regions 260 of the mounting plates 150. The lifting column segments 110, as shown in FIGS. 1a and 1b, also have correspondingly shaped regions in profile at these points.

Figure 3A:
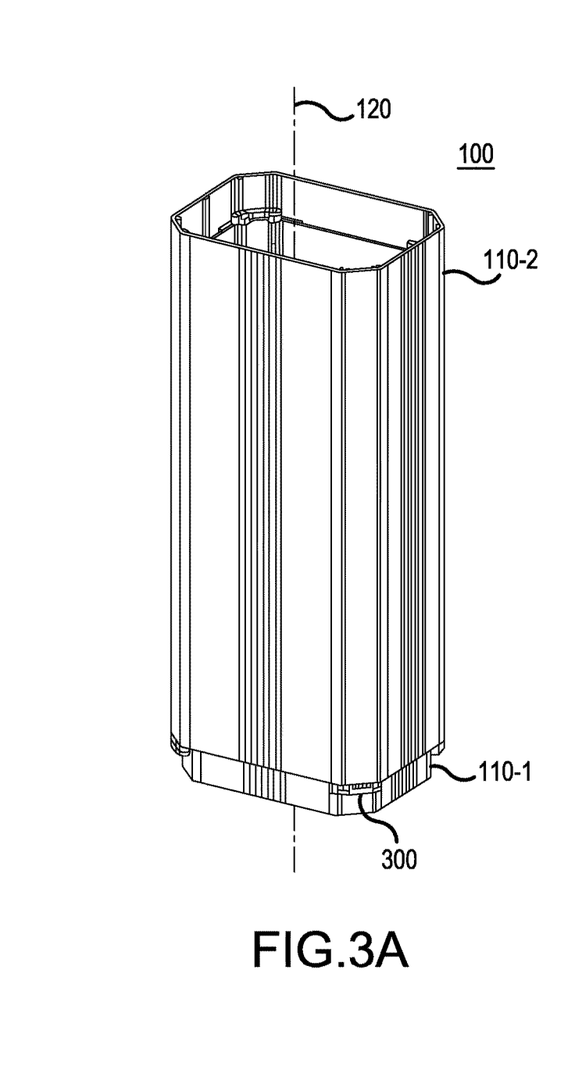
FIG. 3a is a perspective view of a guide tube unit having two guide tube segments.
Figures 3B, 3C:
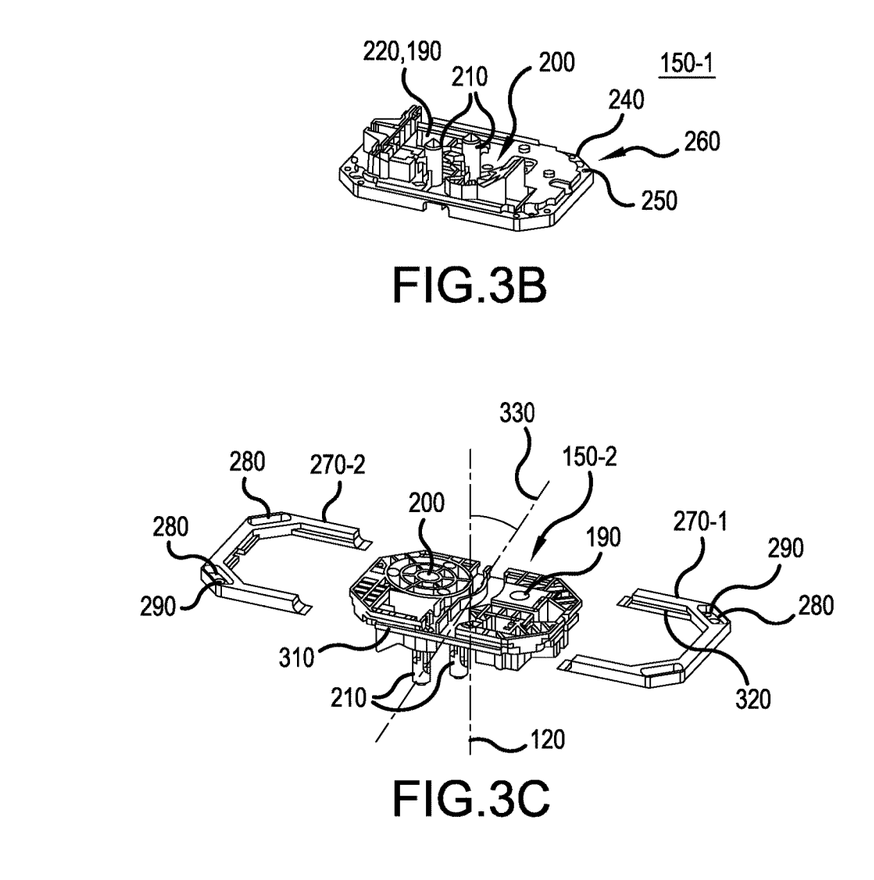
FIG. 3b is a perspective view of a mounting plate according to an exemplary embodiment that includes a plurality of holes for screwing the same to a guide tube segment.
FIG. 3c is a perspective view of a mounting plate according to an exemplary embodiment that includes two adapter components.

The mounting plate 150-2 also includes an attachment structure or guide profile, illustrated in FIG. 3c, on which a corresponding counter-guide profile of one or more adapter components 270-1, 270-2 can be pushed, in a manner that forms an interference-fit between the adapter components 270 and the mounting plate 150. The mounting plate 150-2 can thus be seen as and understood to be formed as a three-part mounting plate.

The adapter components 270 include corresponding attachment structures 280, which in turn also comprise holes 290, by way of which the adapter components 270 and thus the corresponding mounting plate 150 can be fastened to the lifting column segment 110.

Figure 2B:
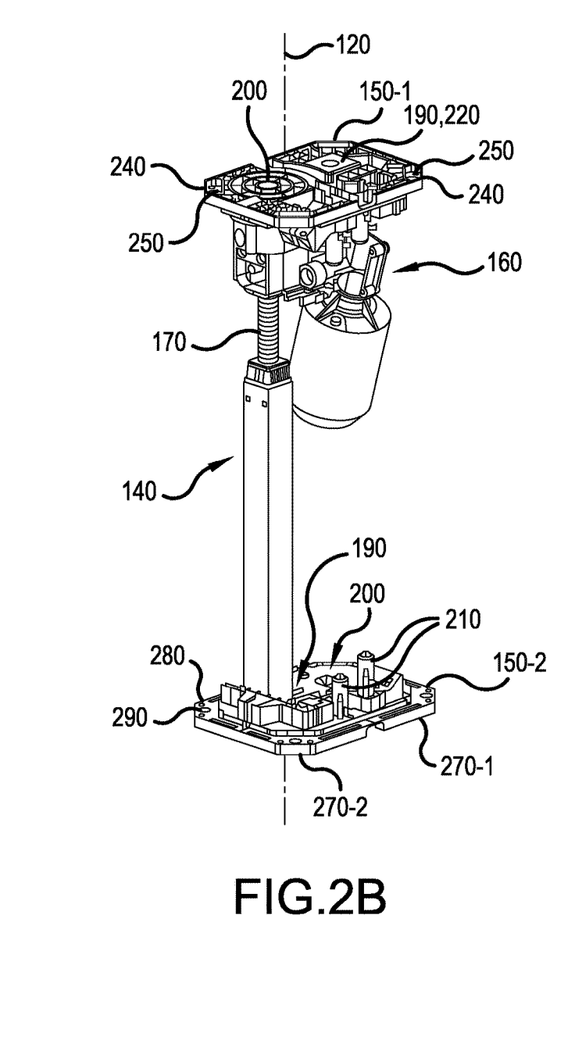
FIG. 2b is a perspective view of a lifting unit attached to two mounting plates according to an exemplary embodiment and a drive motor attached to the upper mounting plate.

FIG. 2b shows a perspective view of a further lifting unit 140 and two mounting plates 150-1, 150-2 connected thereto. In this Figure, the drive motor 160 is disposed on the vertical upper end of the lifting unit 140, i.e. the upper end along the direction of extension 120. Thus, in this embodiment the drive motor 160 is also accommodated by the motor-accommodating structure 200 of the mounting plate 150-1 disposed on the upper vertical end, while the support component 180 is accommodated and attached in the corresponding accommodating structure 190 of the opposing mounting plate 150-2. It is by coincidence that the upper mounting plate 150 is again the mounting plate 150-1 for the inner lifting column segment 110-1, while the mounting plate 150 disposed on the vertically lower end is for the outer lifting column segment 110-2, i.e. the mounting plate 150-2.

Of course, in other exemplary embodiments the roles with respect to the accommodating structures 190, 200 can be reversed between the respective mounting plates 150-1, 150-2.

Thus in the exemplary embodiments shown here of mounting plates 150 and corresponding lifting columns 100, not all accommodating structures 190, 200 of an individual mounting plate 150 are occupied. More specifically, in the exemplary embodiments shown here, only one accommodating structure of the pair of accommodating structures 190, 200 is has a respective opposing component, i.e. the drive motor 160 or the support component 180. However it may also be possible in the case of a lifting unit with two drive motors 160 and two support components 180 that both support structures are respectively equipped with the components intended for them. It may thus be possible to implement an arrangement different from the previously shown arrangements of the respective accommodating structures 190, 200.

A lifting column thus comprises the guide tube segments 110 and the lifting unit 140. The lifting unit 140 includes, among other things, the drive motor 160 and its connections as well as the drive train with an optionally implemented reduction gear. Such a lifting column 100 typically comprises at least two guide tube segments 110, and the lifting unit 140 is conventionally always disposed in the same orientation within the lifting column 100. Thus, for example, the drive motor may always be connected to the outer guide tube segment. Conventionally, the connections, i.e. the power supply line, are typically attached at the position of the drive motor 140.

By using an exemplary embodiment, it is now possible to construct the lifting unit 140 of the lifting column 100 without particular regard to the structure of the guide tube segments 110. This means that the connections do not necessarily have to be configured to match the outer guide tube segment 110. This provides a greater flexibility and/or a simplification of the manufacture of a corresponding lifting column 100.

A lifting column is thus conventionally designed such that the lifting unit 140 is provided with the drive motor 160, the transmission, and optionally further components, and fitted in the lifting column 100 based on the arrangement of guide tube segments 110. Conventionally, the assembly of the guide tube segments 110 could not be built any other way, since the connections were arranged on the same side as on the drive motor.

However, by using a mounting plate 150 and a lifting column according to an exemplary embodiment, the guide tube segments 110 and the lifting unit 140 of the lifting column 100 can now be constructed substantially independently from one another. The lifting unit 140 then be integrated into the assembly of the guide tube segments 110 at the final stage of manufacture according to customer requirements. The mounting plates 150, which are also referred to as the upper and lower base plates, have the above-described, innovative design, which makes possible an attachment of the mounting plates, with or without additional parts, to the outer and/or inner guide tubes segment 110.

By using exemplary embodiments, a modular system is thus provided with which it is possible to prefabricate the essential main components independently from one another, i.e. the lifting unit 140 as well as the guide tube segments 110. This can likewise make it possible to examine and test these components separately from one another. Finally, the manner in which the lifting unit 140 is to be integrated into the guide tube segment assembly can, for the most part, be freely chosen at the final stage of manufacture. In this way it can likewise also be possible to reduce the manufacturing time compared to a standard manufacturing method.

Parts of the main components need not be doubled in order to manufacture both versions of a lifting column. At the end of the process, the customer can decide which side of the lifting column 100 should include the drive motor 160. The weight associated with the drive motor 160 can thus be attached to or associated with either side as desired so that vibrations and noise can be influenced in a desired manner.

FIG. 3a shows a view, similar to that of FIG. 1b, of a lifting column 100 wherein the guide tube segment 110-1 is the inner guide tube segment and the guide tube segment 110-2 is the outer guide tube segment 110. In contrast to the view in FIG. 1b, in the view shown in FIG. 3b, the cover 130 is not shown. Accordingly, in comparison to the view in FIG. 1b, FIG. 3a shows a plurality of mounting structures 300 that can be used to attach the cover 130.

FIG. 3b shows a perspective view of the mounting plate 150-1, as was already visible in the context of FIGS. 2a and 2b. In FIG. 3b, however, the lifting unit 140 and the drive motor 160 are not shown in order to provide a clearer view of the accommodating structure 190 for the support component 180 and the motor-accommodating structure 200 for the drive motor 160. FIG. 3b also shows the two domes 210 for cable routing.

With regard to the accommodating structure 190, FIG. 3b further shows the shape of the accommodating structure as a substantially square opening 220 that extends into the respective mounting plate 150-1. The opening 220 has a regular polygonal cross-sectional shape with an integer symmetry. More specifically, in the present case the opening 220 has a square cross-sectional shape, and thus has a four-fold rotational symmetry. Of course, in other exemplary embodiments the accommodating structure 190 can also be implemented in a manner other than by a corresponding opening 220. But even if a corresponding opening 220 is used, this can also optionally be implemented using another geometric configuration—a rectangular cross-section, for example.

FIG. 3b further shows, in the region of the chamfered regions 260, the attachment structures 240 with their holes 250 for attaching the mounting plate 150-1 to a respective guide tube segment 110.

FIG. 3c shows the mounting plate 150-2 including the above-described structures, which may comprise the two accommodating structures 190, 200 for the support component 180 and the drive motor 160. FIG. 3c also shows the attachment columns 210 of the motor-accommodating structure 200. However, FIG. 3c additionally shows the guide profile 310 of the mounting plate 150-2 onto which corresponding counter-guide profiles 320 of the adapter components 270-1 and 270-2 are pushable or slidable. The attachment structures 280 make it possible to screw the lifting column segment 110-2 onto the mounting plate 150-2.

Counting the adapter components 270 of the mounting plate 150, the mounting plate 150 comprises a three-part mount. Of course, in other exemplary embodiments more or less than two adapter components 270 can be used. Likewise, structures other than the described guide profiles and counter-guide profiles 310, 320 could optionally be used for mechanically connecting the adapter components 270 and the mounting plate 150.

In order to make possible an assembly that includes the accommodating structure 190 and the motor-accommodating structure 200, these structures are disposed in the exemplary embodiment so that a centerline 330, which lies perpendicular to the direction of extension 120, i.e. the central axis 120, divides the mounting plate 150 into two parts with exactly one of the two accommodating structures 190, 200 disposed on either of the two sides. In this case, the centerline 330 must not extend perpendicular to one of the side surfaces of the respective mounting plate 150, as is nonetheless shown in the context of FIG. 3c. A corresponding centerline 330 can likewise be found in the other mounting plates 150; however it is not an essential feature of an exemplary embodiment of a mounting plate 150. Thus parts of the motor-accommodating structure 200 can also optionally be disposed on the same side as those of the accommodating structure 190.

Exemplary embodiments of a mounting plate 150 and a corresponding lifting column 100 may allow for a flexible manufacturing system in which the lifting unit 140, i.e. the drive unit of the lifting column 100, can be integrated into a lifting column 100 in different, variable arrangements and versions according to the demands of a customer. Thus for example the drive motor 160 can be disposed either in the region of the upper mounting plate 150 or in the region of the lower mounting plate 150. Exemplary embodiments can be implemented with electrically-driven drive motors 160, however they are by no means limited to this drive technology. Thus corresponding hydraulic and/or pneumatic actuators or motors can also be used.

By using an exemplary embodiment it is thus possible to simplify or make more flexible the manufacturing of a lifting column 100 according to an exemplary embodiment.

The features disclosed in the foregoing description, the following claims, and the accompanying Figures can be meaningful and can be implemented both individually as well as in any combination for the realization of an exemplary embodiment in its various embodiments.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved mounting plates and lifting columns.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Guide tube unit
110 Guide tube segment
120 Central axis/direction of extension
130 Cover
140 Lifting unit
150 Mounting plate
160 Drive motor
170 Threaded spindle
180 Support component
190 Accommodating structure
200 Motor-accommodating structure
210 Attachment structure
220 Opening
230 Reinforcing structure
240 Attachment structure
250 Hole
260 Chamfered region
270 Adapter component
280 Attachment structure
290 Hole
300 Mounting structure
310 Guide profile
320 Counter-guide profile
330 Centerline

What is claimed is:

1. A mounting plate for mounting a lifting unit in a lifting column, the lifting column including at least two guide tube segments, the lifting unit being formed to change a length of the lifting column parallel to a direction of extension, the at least two guide tube segments being substantially concentrically insertable one-into-another and movable with respect to one another along the direction of extension in order to change the length of the lifting column, the mounting plate comprising:
   a motor-accommodating structure for a drive motor of the lifting unit; and
   an accommodating structure, different from the motor-accommodating structure, for a support component of the lifting unit, the support component being connectable to the mounting plate in a rotationally fixed manner,
   wherein the support component is disposed on a side of the lifting unit remote from the drive motor, and
   further comprising an attachment structure formed to connect the mounting plate to one of the at least two guide tube segments, wherein the attachment structure has a plurality of holes formed and disposed such that the mounting plate is screwable to the one guide tube segment of the at least two guide tube segments and wherein the attachment structure comprises a guide profile formed such that a counter-guide profile of an adapter component is pushable onto the guide profile, and so that the mounting plate is screwable to the one or to another guide tube segment of the at least two guide tube segments via a plurality of holes in the adapter component.

2. The mounting plate according to claim 1, wherein the accommodating structure is formed so as to provide a rotationally fixed connection to the support component based on a rotational movement about the direction of extension by an interference-fit connection or a friction-fit connection or an interference-fit and a friction-fit connection to the support component.

3. The mounting plate according to claim 2, wherein the accommodating structure has a polygonal cross-section perpendicular to the direction of extension.

4. The mounting plate according to claim 2, wherein the accommodating structure has an opening formed to accommodate the support component.

5. The mounting plate according to claim 1, wherein the accommodating structure is located on a first side of a centerline running perpendicular to the direction of extension and the motor accommodating structure is located on a second side of the centerline.

6. The mounting plate according to claim 1 manufactured from an injection-moldable material.

7. A lifting column comprising
   the mounting plate according to claim 1.

8. A pair of mounting plates for mounting a lifting unit, the lifting unit having a motor and a support component, in a lifting column comprising first and second telescoping tube segments, the first and second telescoping tube segments each having a longitudinal axis, an interior and a profile perpendicular to the longitudinal axis,
   a first mounting plate of the pair of mounting plates having a first periphery configured to be slidingly received in the interior of the first tube segment, a first side and a second side spaced from the first side in a direction of the longitudinal axis, the first and second sides being bounded by the first periphery, a motor mount comprising a raised platform on the first mounting plate first side and a support mount comprising a polygonal socket on the first mounting plate first side; and
   a second mounting plate of the pair of mounting plates having a second periphery configured to be slidingly received in the interior of the second tube segment, a first side and a second side spaced from the second mounting plate first side in the direction of the longitudinal axis, the first and second sides of the second mounting plate being bounded by the second periphery, a motor mount comprising a raised platform on the second mounting plate first side and a support mount comprising a polygonal socket on the second mounting plate first side,
   wherein the pair of mounting plates are mountable in the first and second telescoping tube segments with the first side of the first mounting plate facing the first side of the second mounting plate, and
   wherein the motor mount of the first mounting plate has a third periphery and wherein no portion of the support mount of the first mounting plate is located inside the third periphery.

9. The pair of mounting plates according to claim 8, further including a motor mounted to the motor mount of the first mounting plate and a support mounted to the support mount of the second mounting plate and operatively connected to the motor.

10. The pair of mounting plates according to claim 9, wherein the first mounting plate comprises a plate body and the first periphery comprises first and second attachment elements slidably mounted on the plate body.

11. A lifting column having a longitudinal axis and comprising:
   a first tube segment having an interior;
   a second tube segment having an interior and slidingly mounted in the first tube segment for sliding movement in a direction of the longitudinal axis;
   a first mounting plate mounted in the first tube segment and having a first side and a second side spaced from the first side in the direction of the longitudinal axis, a motor mount comprising a raised platform on the first mounting plate first side and a support mount comprising a polygonal socket on the first mounting plate first side;

a second mounting plate mounted in the second tube segment and having a first side and a second side spaced from the second mounting plate first side in the direction of the longitudinal axis, a motor mount comprising a raised platform on the second mounting plate first side and a support mount comprising a polygonal socket on the second mounting plate first side;

a motor mounted on the motor mount of the first mounting plate; and a support mounted on the support mount of the second mounting plate and operatively connected to the motor, wherein the motor mount of the first mounting plate has a periphery and wherein no portion of the support mount of the first mounting plate is located inside the periphery.

12. The lifting column according to claim 11, wherein the first mounting plate comprises a plate body from which the raised platform projects and first and second attachment elements slidably mounted on a periphery of the plate body.

13. The pair of mounting plates according to claim 8, wherein the support mount of the first mounting plate is located entirely on a first side of a centerline running perpendicular to the longitudinal axis and the motor mount of the first mounting plate is located entirely on a second side of the centerline.

14. The pair of mounting plates according to claim 8, wherein the first mounting plate and the second mounting are substantially identical.

15. The lifting column according to claim 11, wherein the motor mount of the first mounting plate is located entirely on a first side of a centerline of the first mounting plate and the support mount of the first mounting plate is located entirely on a second side of the centerline.

16. The pair of mounting plates according to claim 8, wherein the support mount of the first mounting plate has a fourth periphery and wherein no portion of the motor mount of the first mounting plate is located inside the fourth periphery.

17. A lifting column comprising the pair of mounting plates according to claim 8.

18. The lifting column according to claim 11, wherein the support mount of the first mounting plate has a second periphery and wherein no portion of the motor mount of the first mounting plate is located inside the second periphery.

19. The lifting column according to claim 11, wherein the first mounting plate and the second mounting are substantially identical.

20. The lifting column according to claim 8, wherein the first mounting plate comprises a plate body from which the raised platform projects, wherein a peripheral portion of the plate body comprising a profile, and wherein a first attachment element and a second attachment element are slidably mounted on the profile.

* * * * *